United States Patent [19]

Pied

[11] 4,075,784
[45] Feb. 28, 1978

[54] METHOD FOR INCREASING THE PRODUCTIVE YIELD OF CROPS WITH POLYOLEFIN FILMS

[75] Inventor: Jean-Philippe Pied, Verneuil en Halatte, France

[73] Assignee: Societe des Plastiques de Carmaux Scasar, Saint Benoit de Carmaux, France

[21] Appl. No.: 687,882

[22] Filed: May 19, 1976

Related U.S. Application Data

[62] Division of Ser. No. 611,815, Sept. 8, 1975.

[51] Int. Cl.² .................................................. A01G 7/00
[52] U.S. Cl. .......................................... 47/9; 47/29; 47/17; 260/42.46; 47/DIG. 7
[58] Field of Search ............... 260/42.46; 47/58, 9, 47/26, 29, DIG. 6, DIG. 7

[56] References Cited

U.S. PATENT DOCUMENTS

| 1,930,939 | 10/1933 | Horner | 47/9 |
| 3,088,244 | 5/1963 | Commisso | 47/29 |
| 3,353,297 | 11/1967 | Gervais | 47/29 X |
| 3,592,792 | 7/1971 | Newland et al. | 47/9 X |
| 3,857,804 | 12/1974 | Glatti et al. | 47/9 X |

FOREIGN PATENT DOCUMENTS

| 1,574,088 | 7/1969 | France | 47/29 |
| 2,213,954 | 8/1974 | France | 47/29 |
| 1,112,597 | 3/1956 | France | 47/29 |
| 1,459,539 | 10/1966 | France | 47/29 |

Primary Examiner—Robert E. Bagwill
Attorney, Agent, or Firm—Finnegan, Henderson, Farabow & Garrett

[57] ABSTRACT

A method for increasing the productive yield of crops by heat retention, comprising covering or mulching the crops with a polyolefin film containing from about 1 to 15% based on the weight of the polyolefin of an essentially dehydrated kaolinite containing from about 51 to 57% by weight silica, 40 to 46% by weight alumina and less than 3% impurities.

16 Claims, 1 Drawing Figure

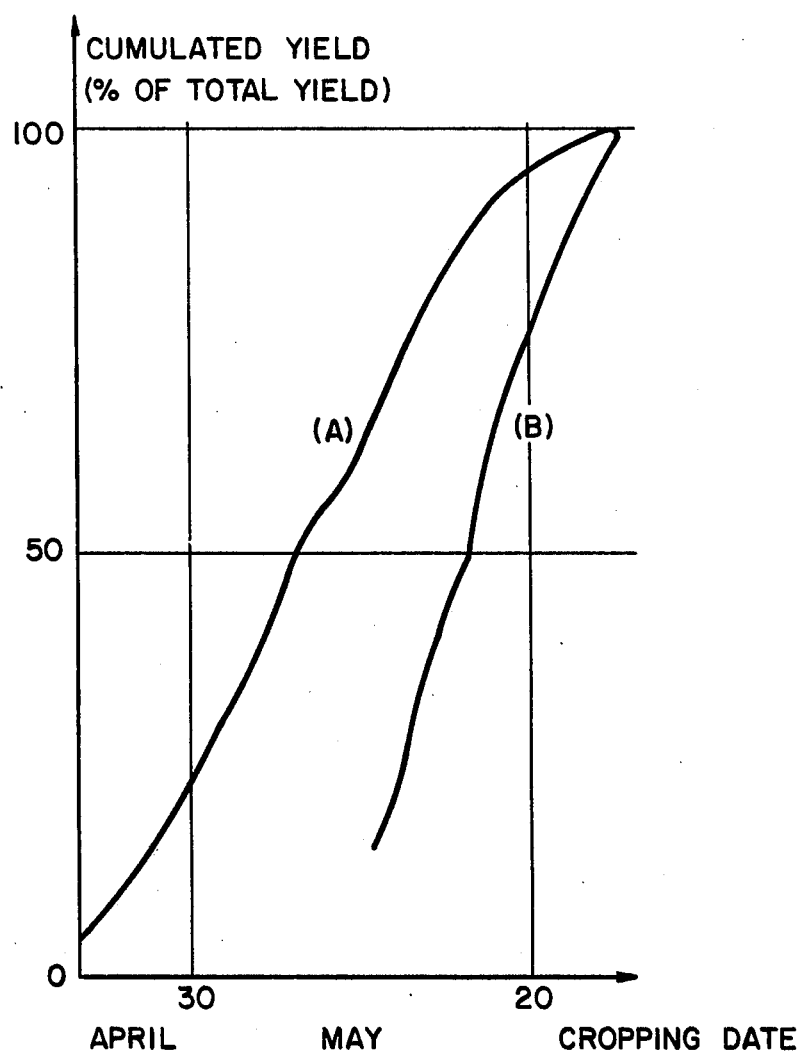

METHOD FOR INCREASING THE PRODUCTIVE YIELD OF CROPS WITH POLYOLEFIN FILMS

This is a division of application Ser. No. 611,815, filed Sept. 8, 1975.

This invention relates to new and improved polyolefin compositions suitable for use in the production of solid polyolefin films having improved infrared radiation absorption characteristics in the wave-length range of from 5 to 15 microns. More particularly, the invention relates to polyolefin compositions containing a dehydrated kaolinite, solid polyolefin film produced from such compositions, and to a method for increasing the productive yield of agricultural crops by covering them or mulching with such films.

As is well known to those skilled in the art, many polyolefins and in particular low-density polyethylene are very transparent to infrared radiation in the wave-length range of from 5 to 15 microns. Ordinary polyethylene film, for example, when used as a cover for crops or mulching, cannot adequately contain the heat emitted by the soil during the night, and, consequently, does not adequately protect the crops against frost. Similarly, ordinary polyethylene film does not protect the crops from being killed by sun scorch during the day.

Heretofore, polyvinylchloride films have generally been used in the agricultural industry to cover crops or for mulching because they have satisfactory absorption characteristics, but polyvinylchloride has the disadvantage of being brittle in cold weather and because of its plasticizers tends to dissolve in wet weather. Moreover, they are generally higher in cost than polyolefin films.

Thus, there is a need, and particularly in the agricultural industry, for solid polyolefin films which are as little transparent as possible to infrared radiations.

It is, therefore, a primary object of the present invention to provide new and improved polyolefin compositions suitable for use in the production of solid polyolefin films that have good infrared absorption characteristics in the wave-length range of from 5 to 15 microns.

Yet, another object of this invention is to provide a solid polyolefin film having improved infrared radiation absorption characteristics suitable for use as a covering or mulching material to increase the yield of agricultural crops by heat retention.

Additional objects and advantages will be set forth in part in the description which follows and in part will be obvious from the description or may be learned by practice of the invention, the objects and advantages being realized and attained by means of the compositions, processes and improvements particularly pointed out in the appended claims.

To achieve the foregoing objects and in accordance with its purpose, this invention as embodied and broadly described provides a polyolefin composition containing a polyolefin and from about 1 to 15% based on the weight of the polyolefin of an essentially dehydrated kaolinite containing from 51 to 57% by weight silica, from 40 to 46% by weight alumina and less than 3% of impurities.

The invention further provides a method for increasing the yield of agricultural crops by covering said crops or mulching with a polyolefin film containing from about 1 to 15% based on the weight of the polyolefin of an essentially dehydrated kaolinite containing from 51 to 57% by weight silica, from 40 to 46% by weight alumina and less than 3% of impurities.

The invention also provides a method for improving the absorption characteristics of polyolefin film and the polyolefin film so produced, comprising incorporating into a polyolefin from about 1 to 15% based on the weight of the polyolefin of an essentially dehydrated kaolinite containing from 51 to 57% by weight silica, from 40 to 46% by weight alumina and less than 3% of impurities.

It is to be understood that both the foregoing general description and the following detailed description are exemplary and explanatory but are not restrictive of the invention.

Exemplary of polyolefins suitable for use in the present invention are homopolymers of olefinic hydrocarbons, such as low-density and high-density polyethylene, polypropylene and poly-1-butene, as well as copolymers prepared by copolymerizing, for example, ethylene with vinyl acetate, propylene, carbon monoxide, 1-butene, maleic anhydride and the like.

In accordance with the invention, polyolefin compositions are prepared containing a polyolefin and an essentially dehydrated kaolinite to improve the infrared radiation absorption characteristics of the films produced from such compositions in the wave-length range of from 5 to 15 microns.

The kaolinite is used in an amount of from 1 to 15% by weight based on the weight of the polyolefin and, more preferably, in an amount of from 3 to 10% by weight. The dehydrated kaolinite may be obtained by calcination of a hydrated alumino-silicate selected from the group consisting of kaolinite, dickite, nacrite, halloysite and anauxite. Kaolinite, dickite and nacrite are polymorphic forms of $Al_2O_3.2SiO_2.2H_2O$; halloysite is a hydrated kaolinite of the formula $Al_2O_3.2SiO_2.4H_2O$; and anauxite is similar but contains a little more silica than kaolinite.

The dehydrated product obtained by calcination of these alumino-silicates corresponds approximately to the formula $Al_2O_3.2SiO_2$ and has a theoretical composition of 54% silica and 46% alumina. Generally, it has been found that the dehydrated kaolinite suitable for use in the present invention should have from 51 to 57% silica and from 40 to 46% alumina with less than 3% impurities. As shown in greater detail in the examples below, polyolefin films containing aluminosilicates having alumina and silica proportions outside these ranges have been found to have less radiation retention than films produced from the compositions of the present invention.

Minor amounts of other silicates, or sulphates, or carbonates based on the weight of the dehydrated kaolinite may be tolerated without departing from the scope of the present invention. Such other silicates may be biedellite, $2Al_2O_3.3SiO_2.4H_2O$; pyrophyllite, $Al_2O_3.4SiO_2.H_2O$; talc, $3MgO.4SiO_2.H_2O$; and the like and they may be hydrated or preferably in dehydrated form. In addition, the dehydrated kaolinite may contain up to 3% by weight of impurities, such as magnesia (MgO), lime (CaO), sodium monoxide ($Na_2O$), titanium dioxide ($TiO_2$) and iron oxide ($Fe_2O_3$).

In accordance with the present invention, it has been found that the presence of from 1% to 15% by weight based on the weight of the polyolefin of such a kaolinite greatly enhances the infrared radiation absorption characteristics of solid films produced from such polyolefins.

The compositions are conventionally prepared by any well-known technique such as by mixing or blending the polyolefin and kaolinite in a Banbury-type mixer. Suitable stabilizers, as is well known to those skilled in the art, may also be incorporated into the polyolefin compositions.

It is essential that the kaolinite used in the present invention be completely or essentially dehydrated, for otherwise the water liberated by the kaolinite during the manufacture of solid films from the compositions would be detrimental to the final product. Preferably, the kaolinite is also finely divided and has an average particle size of about 1 to 5 microns.

The solid films produced from the above compositions are particularly useful in the agricultural industry for the protection of agricultural crops. Such films generally are made in the thickness of between 20 to 200 microns. As more fully described in the following examples, these films have infrared radiation absorption characteristics generally comparable to polyvinylchloride films in the wave-length range of from 5 to 15 microns and, when used as a cover or mulch for agricultural crops, significantly increase their yield.

The films are strong and stable under both the action of cold and rain as compared to polyvinylchloride films and their cost is much lower. Consequently, they have excellent properties for mulcing, semi-forcing, and the production of silage, as calories stored under the film during the day remain trapped at night. It has been found, for example, that when polyolefin films produced according to the present invention are used to line greenhouses, they significantly limit heat drop, prevent plants in the greenhouses from being killed by sun scorching, and realize savings of up to 30% in the costs of the fuel used to heat the greenhouses.

Moreover, it has been found that the growth patterns and yields of a large variety of plants can be significantly increased when they are mulched with films according to the present invention. Such plants include strawberries, melons, carrots, radishes, beans, parsley, and the like. For example, with such films the yields of melons have been increased by 110%; with potatoes 40%; and with tomatoes 50%, as compared to plants grown without such films.

The drawing illustrates graphically the improvement in cumulative yields of crops as a function of time grown under films produced according to the present invention, compared to crops grown under ordinary polyolefin films lacking the essentially pure and dehydrated kaolinite provided in the present invention. In the drawing, graph (B) shows the yield of crops grown under ordinary polyethylene film having a density of 0.922. Graph (A), on the other hand, shows the yield of crops grown under a polyethylene film containing 8% based on the weight of the film of a dehydrated kaolinite in accordance with the present invention. It can be seen from the graph that crops grown under films of the present invention have a larger and earlier cropping time than crops grown under ordinary polyethylene film for otherwise identical planting times and conditions.

To illustrate the invention more specifically, reference is made to the following examples. These examples illustrate the preparation of polyolefin films containing dehydrated kaolinite and their infrared absorption characteristics as well as their comparison with similar polyolefin films containing alumino-silicates other than dehydrated kaolinite.

The examples are merely illustrative and are not to be understood as limiting the scope and underlying principles of the invention in any way. All parts and percentages referred to herein are by weight unless otherwise specifically indicated.

EXAMPLE 1

9.25 parts by weight of polyethylene having a density of 0.92 and a melt index of 1g/10mn (as measured according to ASTM Standard No. D1238) were blended with 7.5 parts by weight of a dehydrated kaolinite ("Argical," Blancs Mineraux of Paris, France), containing 1.5% $H_2O$, 52.5% $SiO_2$, 43.5% $Al_2O_3$, and 2.5% impurities. The kaolinite had an average particle size of approximately 2 microns.

The blending was carried out in a Banbury-type mixer. The blend was then transformed into films having a thickness of about 90 microns and submitted to infrared spectrophotometric measurements.

The percentage of soil radiation energy which was not retained in the wave-length range from 5 to 15 microns was 30.5% which compares favorably with the values heretofore obtained for polyvinylchloride films (29%).

EXAMPLES 2-7

The procedure of Example 1 is repeated in Examples 2-7, except that different dehydrated kaolinites identified by their trademark and company name and of varying aluminasilica concentrations within the heretofore defined ranges were substituted for the kaolinite used in Example 1.

The compositions of the kaolinites and the results of the infrared spectrophotometric tests on each of the resulting polyethylene films are reported below in Table 1.

As in Example 1, it can be seen that each of the polyethylene films containing the various kaolinites had infrared radiation absorption characteristics essentially similar to those obtained from polyvinylchloride films.

TABLE 1

| Example | Kaolinite | Company Name | % $H_2O$ | % $SiO_2$ | % $Al_2O_3$ | % Impurities | Average Particle Size | % Energy Not Retained |
|---|---|---|---|---|---|---|---|---|
| 2 | Clay 33 | Columbian Carbon Co., Inc., U.S.A. | — | 54 | 43.8 | — | — | 31 |
| 3 | MKCO | Reinbolt et Fils, France | — | 52.8 | 41 | — | — | 34 |
| 4 | Translink 37 | Freeport Columbian, U.S.A. | 0.5 | 52.8 | 44.8 | — | >2μ | 30 |
| 5 | Whitetex No. 2 | Freeport Columbian, U.S.A. | 0.5 | 53.9 | 43.5 | 2.1 | >2μ | 29.5 |
| 6 | Satintone | Engelhard Minerals & Chemicals Corp. | 0.9 | 52.9 | 45.2 | 1 | 1μ | 30 |

TABLE 1-continued

| Example | Kaolinite | Company Name | % H₂O | % SiO₂ | % Al₂O₃ | % Impurities | Average Particle Size | % Energy Not Retained |
|---|---|---|---|---|---|---|---|---|
| 7 | M 100 | U.S.A. English China Clays Ltd., England | 0.5 | 52.8 | 43.8 | — | >2μ | 30 |

EXAMPLE 8

This example is carried out to illustrate the superior performance achieved by using the specific dehydrated kaolinites defined in accordance with the present invention over other alumino-silicate compounds falling outside the scope of the present invention when used with identical polyolefins.

In this example, 92.5 parts by weight of the polyethylene used in Example 1 was blended with 7.5 parts by weight of an alumino-silicate compound in a Banbury-type mixer. The alumino-silicate ("Tuboryl," Silice et Kaolin of France) contained 62% SiO₂, 35% Al₂O₃, and 2.6% impurities with an average particle size of 1.5 microns. The blend was then transformed into a film of about 90-microns thickness.

Infrared spectrophotometric measurements were then taken on the film and it was found that the percentage of soil radiation energy that was not retained in the wavelength range of from 5 to 15 microns was 38%.

It can be seen that the absorption characteristics of this polyethylene film containing unsuitable proportions of alumina and silica had less desirable absorption characteristics than polyvinylchloride films or any of the films of Examples 1–7.

EXAMPLES 9–18

The procedure of Example 8 was repeated in Examples 9–18 using other alumino-silicate compounds having undesirable contents of water and/or unsuitable proportions of alumina and silica. The alumino-silicate compounds used in each example as well as the results of the spectrophotometric tests conducted on each resulting polyethylene film are reported below in Table 2.

In each case the percentage of soil radiation energy retained by the films was less than in the case of films prepared in accordance with the present invention.

EXAMPLE 19

92.5 parts by weight of a copolymer of ethylene and vinyl acetate having 12% by weight vinyl acetate, said copolymer having a melt index of 2g/10mn (as measured according to ASTM Standard No. D1238) were blended in a Banbury-type mixer with 7.5 parts by weight of the dehydrated kaolinite of Example 1.

Films made from this blend and having a thickness of about 80 microns were submitted to infrared spectrophotometric measurements.

The percentage of soil radiation energy which was not retained in the wave-length range from 5 to 15 microns was 21.5%.

The invention in its broader aspects is not limited to the specific details shown and described and departures may be made from such details without departing from the principles of the invention and without sacrificing its chief advantages.

What is claimed is:

1. In a method for increasing the productive yield of crops by covering the crops with plastic film, the improvement comprising retaining heat by covering said crops with a polyolefin film containing from about 1 to 15% based on the weight of the polyolefin of an essentially dehydrated kaolinite containing from about 51 to 57% by weight silica, 40 to 46% by weight alumina and less than 3% impurities.

2. The method of claim 1, in which the polyolefin is low-density polyethylene.

3. The method of claim 1, in which the kaolinite is used in an amount of from 3 to 10% by weight.

4. The method of claim 1, wherein the polyolefin is selected from the group consisting of polyethylene, polypropylene, poly-1-butene and copolymers thereof.

TABLE 2

| Example | Alumino-Silicate | Company Name | % H₂O | % SiO₂ | % Al₂O₃ | % Impurities | Average Particle Size | % Energy Not Retained |
|---|---|---|---|---|---|---|---|---|
| 9 | Suprafil | Patek, Czechoslovakia | — | 37 | 36.5 | — | — | 38 |
| 10 | Vercoryl | Silice et Kaolin, France | 11.5 | 50 | 36 | 2.4 | 0.75μ | 43 |
| 11 | perlite | — | — | 72.5 | 15 | 10.6 | — | 55 |
| 12 | Argirec | Blancs Mineraux de Paris, France | 13 | 47.5 | 36.5 | 3 | — | 42 |
| 13 | Bucca Clay | Columbian Carbon Co., Inc., U.S.A. | 13.8 | 44.6 | 39.4 | 2.2 | 2μ | 44 |
| 14 | Attasorb RVM | Engelhard Minerals & Chemicals Corp. U.S.A. | — | 68 | 12 | 8.4 | — | 55 |
| 15 | ASP | Engelhard Minerals & Chemicals Corp. U.S.A. | 13.2 | 45.6 | 39 | 2 | — | 45 |
| 16 | Omya II | Pluess Stauffer (North American) Inc., U.S.A. | 13.8 | 45.4 | 38.9 | 1.9 | — | 45 |
| 17 | Micaflor | AMC, India | 4.3 | 48.5 | 33.3 | 13.9 | 88μ | 45 |
| 18 | Simaflor | AMC, India | 8.1 | 48.5 | 12.1 | 31.3 | — | 42 |

5. The method of claim 1, wherein the average particle size of the dehydrated kaolinite is from 1 to 5 microns.

6. The method of claim 1, further including a minor amount based on the weight of said dehydrated kaolinite of a compound selected from the group consisting of silicates, sulphates and carbonates.

7. The method of claim 6 in which the silicates are selected from the group consisting of diedellite, pyrophyllite and talc in either hydrated or dehydrated form.

8. The method of claim 1, wherein said film has a thickness between 20 and 200 microns.

9. In a method for increasing the productive yield of crops by mulching the crops with plastic film, the improvement comprising mulching said crops with a polyolefin film containing from about 1 to 15% based on the weight of the polyolefin of an essentially dehydrated kaolinite containing from 51 to 57% by weight silica, 40 to 46% by weight alumina and less than 3% impurities.

10. The method of claim 9, in which the polyolefin is low-density polyethylene.

11. The method of claim 9, in which the kaolinite is used in an amount of from 3 to 10% by weight.

12. The method of claim 9, wherein the polyolefin is selected from the group consisting of polyethylene, polypropylene, poly-1-butene and copolymers thereof.

13. The method of claim 9, wherein the average particle size of the dehydrated kaolinite is from 1 to 5 microns.

14. The method of claim 9, further including a minor amount based on the weight of said dehydrated kaolinite of a compound selected from the group consisting of silicates, sulphates and carbonates.

15. The method of claim 14, in which the silicates are selected from the group consisting of diedellite, pyrophyllite and talc in either hydrated or dehydrated form.

16. The method of claim 9, wherein said film has a thickness between 20 and 200 microns.

* * * * *